US008196378B2

(12) United States Patent
Ford (10) Patent No.: US 8,196,378 B2
(45) Date of Patent: Jun. 12, 2012

(54) BUCKLE-FREE SLIP-ON HORSE BOOT WITH GAITER

(75) Inventor: Garrett N. Ford, Tucson, AZ (US)

(73) Assignee: Easycare, Inc., Tucson, AZ (US)

( * ) Notice: Subject to any disclaimer, the term of this patent is extended or adjusted under 35 U.S.C. 154(b) by 370 days.

(21) Appl. No.: 12/340,506

(22) Filed: Dec. 19, 2008

(65) Prior Publication Data
US 2009/0100808 A1  Apr. 23, 2009

Related U.S. Application Data

(63) Continuation-in-part of application No. 12/274,121, filed on Nov. 19, 2008, now Pat. No. 7,578,115, which is a continuation-in-part of application No. 11/281,359, filed on Nov. 17, 2005, now Pat. No. 7,461,497, which is a continuation-in-part of application No. 10/948,584, filed on Sep. 23, 2004, now abandoned, and a continuation-in-part of application No. 10/755,984, filed on Jan. 13, 2004, now Pat. No. 7,490,458, which is a continuation-in-part of application No. 10/910,977, filed on Aug. 4, 2004, now Pat. No. 7,174,858, which is a continuation-in-part of application No. 10/755,945, filed on Jan. 13, 2004, now abandoned.

(60) Provisional application No. 61/009,149, filed on Dec. 24, 2007, provisional application No. 60/635,588, filed on Dec. 13, 2004, provisional application No. 60/506,243, filed on Sep. 26, 2003.

(51) Int. Cl.
*B68C 5/00* (2006.01)
*A01L 3/00* (2006.01)

(52) U.S. Cl. ............................................. 54/82; 168/18

(58) Field of Classification Search .......... 54/82; 168/1, 168/18; 36/111; D30/146
See application file for complete search history.

(56) References Cited

U.S. PATENT DOCUMENTS

| 175,062 | A | | 3/1876 | Fennel | |
|---|---|---|---|---|---|
| 275,872 | A | * | 4/1883 | Taylor | 168/25 |
| 288,220 | A | * | 11/1883 | Fennell | 54/82 |
| 342,790 | A | * | 6/1886 | Fenton | 54/82 |
| 538,685 | A | | 5/1895 | Larsen | |
| 830,403 | A | | 9/1906 | Barclay | |
| 1,174,848 | A | * | 3/1916 | Gear | 168/18 |
| 3,520,107 | A | | 7/1970 | James et al. | |
| 5,090,138 | A | * | 2/1992 | Borden | 36/102 |
| 5,588,288 | A | * | 12/1996 | Origgi et al. | 54/82 |
| 6,526,920 | B1 | * | 3/2003 | Griffin | 119/850 |
| 7,185,612 | B2 | * | 3/2007 | Faulk | 119/850 |

* cited by examiner

*Primary Examiner* — Son T Nguyen
(74) *Attorney, Agent, or Firm* — Antonio R. Durando (57) ABSTRACT

A horse boot (10) includes a shell (12) and a gaiter (22). The shell has a sole (14) and an upper (16) with a vertical slit (18). The gaiter (22) is releasably attached to the heel of the upper and is wrapped around the pastern (P) above the hoofs hairline (C) and below the fetlock to anchor the shell to the pastern and function as a barrier against debris. The gaiter includes a portion of two-way stretch material (60) that makes it possible to fold it out of the way for ease of installation. The process is further facilitated by the slit (18) that allows spreading of the shell. By shaping the upper (16) so that it presses against the hoof (H) the boot is advantageously held in place using only the gaiter anchored to the heel of the boot and strapped to the pastern of the horse.

13 Claims, 11 Drawing Sheets

BUCKLE-FREE SLIP-ON HORSE BOOT WITH GAITER

REFERENCE TO RELATED APPLICATIONS

This application is base on provisional application No. 61/009,149, filed Dec. 24, 2007, and is a continuation-in-part of pending Ser. No. 12/274,121, filed Nov. 19, 2008, which is a continuation application of Ser. No. 11/281,359 filed Nov. 17, 2005, issued as U.S. Pat. No. 7,461,497, which was based on provisional application No. 60/635,588, filed Dec. 13, 2004, and was a continuation-in-part of Ser. No. 10/948,584, filed Sep. 23, 2004, abandoned, which claimed the benefit of provisional application No. 60/506,243, filed Sep. 26, 2003, and was a continuation-in-part of pending Ser. No. 10/755,984, filed Jan. 13, 2004, and a continuation-in-part of Ser. No. 10/910,977, filed Aug. 4, 2004, issued as U.S. Pat. No. 7,174,858, which was a continuation-in-part of Ser. No. 10/755,945, filed Jan. 13, 2004, abandoned.

BACKGROUND OF THE INVENTION

1. Field of the Invention

The invention relates to boots for horses and, in particular, to a buckle-free horse boot.

2. Description of the Prior Art

Horse boots represent one of many types of protective gear for horses. In particular, boots are used to protect the hooves and fetlocks of horses and are sometimes employed in lieu of horseshoes.

A typical horse boot consists of a sole and an upper integral with or secured to the sole. The upper wraps around the back and the side portions of the boot and, in most cases, it defines an opening for a tongue at the front of the boot. The two sides of the upper are connected over the tongue by laces, a buckle, or other means used to secure the boot on the hoof of the horse. The boot is put on the horse by spreading the upper and the tongue, sliding the hoof of the horse into the boot, and tightening the upper around the hoof. The tongue facilitates the spreading of the upper and thus the process of inserting the hoof in the boot.

Many different kinds of horse boots leave been developed over the years in search for a perfect boot that is easy to put on, comfortable to wear, provides the intended protection to the horse's hoof and pastern, and stays on even during the hardest gallop. In fact, all prior-art boots have been deficient in at least some of these objectives because the structural features used to achieve some have been counterproductive with respect to the others.

For instance, ease of installation of the boot on the hoof requires a relatively large tongue opening and flexibility in the upper, features that are inconsistent with the tight fit required to avoid slippage during use. A loose boot also tends to rub against the hoof and pastern and allows debris into the boot, thereby producing irritation or even injury to the horse. After some use, a loose boot is also more likely to come off. Thus, in order to counter these drawbacks, people have endeavored to improve the methods used to secure the boot on the hoof. See, for example, the straps, cables, buckles and lacing systems described in International Publication No. WO 2004/047526, in U.S. Pat. No. 5,661,958, and in U.S. Ser. No. 10/948,584 (abandoned), Ser. No. 10/755,984, Ser. No. 10/910,977 (now U.S. Pat. No. 7,174,858), and No. 10/755,945 (abandoned).

The effect of these improved securing means has simply been to provide a tighter fit over the hoof of the horse. As a results the boot is less likely to come off, but it also forms a rigid enclosure that prevents some of the hoof's physiological functions. It is well known that the hoof of a horse expands when it meets the ground and it contracts when it is raised off the ground. This repeated expansion and contraction of the hoof has the physiological effect of supplementing blood circulation in the hoof and the lower leg of the horse (see T. G. Teskey, "The unfettered foot: a paradigm change for equine podiatry," published at www.easycareinc.com/TheUnfetteredFoot.pdf). The rigid enclosure formed by conventionally tightened boots prevents this natural functions it creates discomfort to the horse and it can even cause deformation of the hoof and related injuries during prolonged riding. Furthermore, the tight fit of prior-art boots is still not sufficient to prevent accumulation of dirt and debris inside the boot. So long as an opening forms during use between the upper of the boot and the hoof, dirt and other material will continue to penetrate and irritate the horse.

This latter problem has been addressed in die prior art by extending the height of the upper of the boot over the hoof's hairline, the pastern, or even the fetlock of the horse, but these solutions have necessarily also caused increased rubbing and related irritation. Thus, co-owned Ser. Nos. 10/948,584 and 10/755,945 and U.S. Pat. No. 7,174,858 introduced the concept of a soft and flexible gaiter or cuff extending from die heel portion of the upper to wrap around the pastern above the front hairline of the horse. This solution has helped shield the boot from debris and protect the hairline from excessive rubbing, thereby providing a significant advance in wearability and comfort. However, it is still not ideal with respect to the process of installing the boot on the hoof of the horse because the gaiter's structure tends to obstruct the introduction of the hoof into the shell of the boot. Therefore, a need still exists for the ideal horse boot that is easily installed on the hoofs prevents accumulation of debris, does not irritate the horses stays in place even during hard use, and permits the physiologically natural blood-circulation function of the hoof.

SUMMARY OF THE INVENTION

The present invention expands the protective function of the gaiter disclosed in the referenced patent applications to also provide easy entry and a reliable anchor for the rear portion of the boot on the hoof of the horse. Such a gaiter is then also preferably combined with a novel shell design featuring a slit in the front portion of the upper that produces a tight fit of the shell on the hoof of the horse even without the use of a restraining mechanism.

One aspect of the invention resides in a boot shell with an upper extending upward below the hairline at the front of the hoof of the horse and with a protective gaiter attached to the back portion of the upper. The gaiter consists of a cuff-like structure capable of wrapping around the pastern of the horse from the back of the boot, thereby securing the back of the boot in position, providing a barrier to infiltration of debris from the rear, and preventing the back of the boot from slipping off die hoof during use. The gaiter is made of much softer material than the upper in order to avoid irritation to the pastern of the horse. Thus, the gaiter is necessarily much more subject to wear and tear than the upper and sole of the boot shell, and it is preferably fastened to the upper by detachable connections that enable its convenient replacement when worn out.

Thus, inasmuch as the gaiter is a discrete component of the overall boot structure designed for easy and convenient replacement, the upper and the gaiter are provided with cooperating coupling elements for releasably connecting the gaiter to the boot shell. The coupling elements can include simple screws, complementary elements designed for snap-on actions tongue-and-groove type of coupling, or other types of releasable fastening connection.

According to an important aspect of the improvements covered by this disclosure, a portion of the gaiter section adjacent to the upper at the back end of the boot is made of so-called "two-way stretch" material, as defined herein, so as to allow the gaiter to be folded backward completely during installation for ease of entry of the hoof into the shell of the boot. The use of such material is needed for this improvement and much preferred over previously used non-stretch or conventional stretch material because it affords the ability to fold the gaiter backward completely and retain its folded configuration for easy installation while still providing the necessary support during use.

Another aspect of the invention lies in a shell that does not require and preferably does not employ a restraining mechanism, such as laces or a buckle, relying instead only on the conforming shape of the shell and the strapping effect of the gaiter attached to the pastern of the horse. To that ends the shell is configured with a continuous upper running along the sides and the front of the boot, without a tongue. An open-ended vertical slit in the front portion of the upper is used instead of a tongue to permit the spreading of the shell during the process of introducing the hoof into the boot while the gaiter is completely folded backward. By shaping the upper so as to press against the sides of the hoof, the boot is advantageously held in place using only the gaiter anchored to the heel of the boot and strapped to the pastern of the horse.

In other embodiments, which are not preferred but may be useful when a user desires an extremely firm grip on the hoof of the horse, the boot may couple the gaiter of the invention with a conventionally tightened shell having a tensioning mechanism that engages each front side of the upper, such as an elastic strap, laces, or a buckle with a cable.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 13 shows the strap of FIG. 11 with the other end threaded through the other side of the gaiter of FIG. 10 and partially pulled through.

DESCRIPTION OF TEE PREFERRED EMBODIMENTS

The advance in the art provided by this invention lies in the advantage achieved by using a replaceable gaiter that may be folded backward completely out of the way during installation of the boot, thereby greatly facilitating the process. Once the boot is installed on the hoof, the gaiter provides an anchoring function for the back of the boot that ensures its stability during use, such that a boot shell may be used without an additional restraining mechanism. In combination, these novel features make it possible to install the boot with ease, provide a comfortable wear fire of debris, prevent accidental loss of the boot allow the natural circulatory action associated with pressing on and releasing the hoof, and protect the pastern and hairline from irritation and chafing.

As used herein, the term "elastic" means capable of stretching when subjected to a tensile force and of contracting to the original condition when such force is released. In view of the fact that most materials exhibit some degree of elasticity, for the purposes of this disclosure and of the claimed invention, the term elastic is limited to materials that can be stretched as described above to at least to 1.4 times their original dimension without rupturing. The term "stretchable" is used to refer to elastic materials, as defined above, that can be elongated at least 1.05 times their original size (that is, they can be stretched at least by 5 percent without loosing elasticity) but not as much as 1.4 times. As defined, all elastic materials are stretchable, but not the other way around. The term "two-way stretch" refers to material that is capable or stretching both ways along one dimension but is not stretchable in the orthogonal dimension. For example, the material may stretch horizontally but not vertically, or vice versa.

Figure 1:
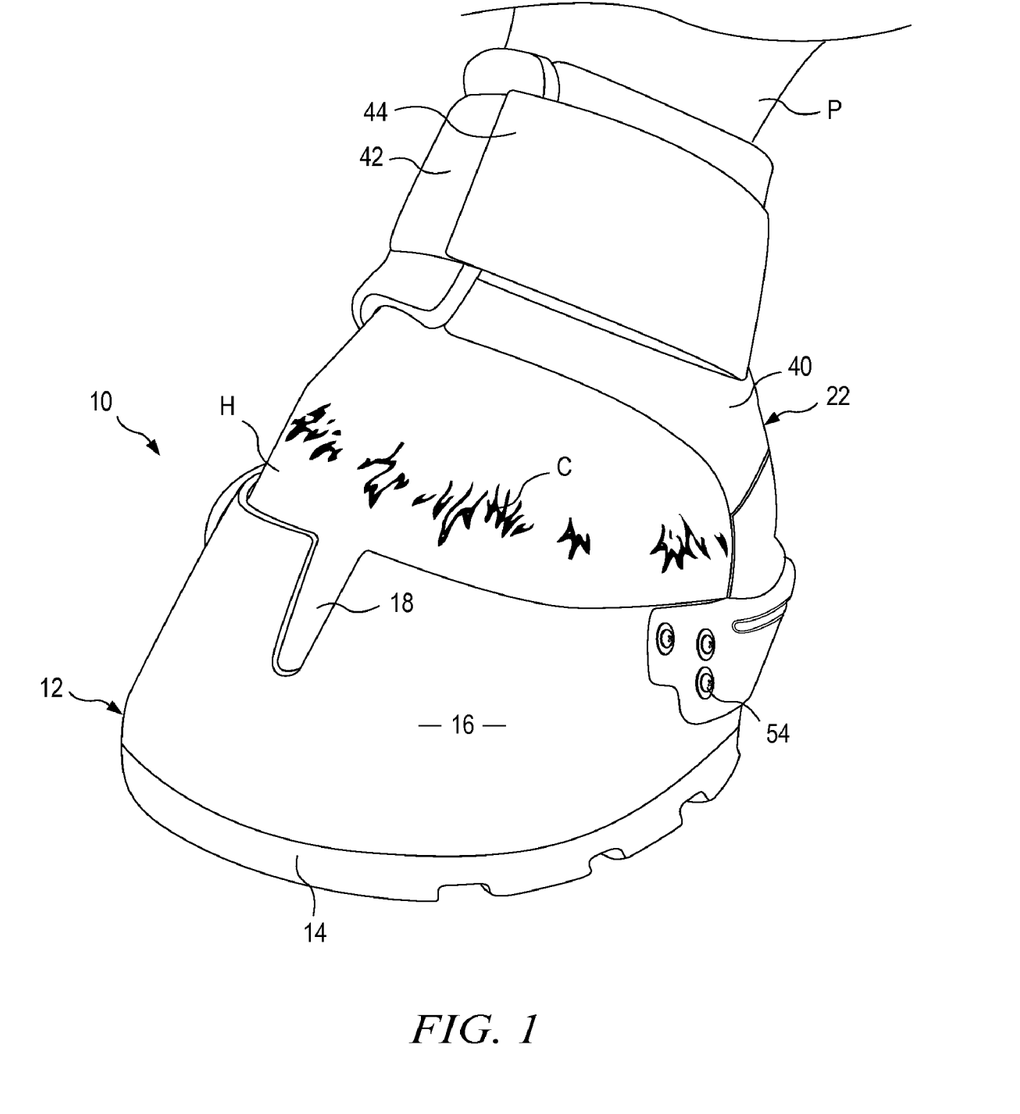
FIG. 1 is a right-side perspective view of the preferred embodiment of the horse boot of the inventions including a substantially rigid shell with a frontal slit for receiving the hoof of the horse and a backward foldable gaiter for wrapping around the pastern of the horse to firmly anchor the boot and protect the leg of the horse.

Referring to the figures, wherein like parts are referenced with the sane numerals and symbols, FIG. 1 is a perspective view of a horse boot 10 according to the invention shown installed on the hoof of a horse. The horse boot 10 comprises two separate components intended for use in combination. The first component is a boot shell 12, which includes a sole 14 with an upper 16 extending upward from the sole. The front portion of the upper features a slit 18 it allows the upper to expand to conform to the size of the hoof wearing the boot. The second component is a gaiter 22 fastened to the rear portion of the boot shell and extending upward to wrap around the pastern P or the leg of the horse.

Figure 2:
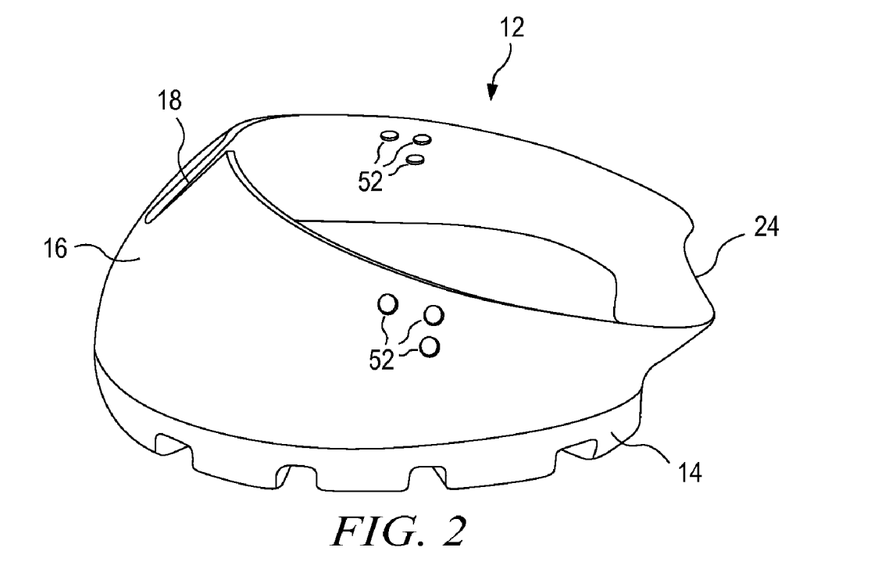
FIG. 2 is a side perspective view of the shell component of the boot of FIG. 1.

The boot shell 12 is preferably made of molded plastic and is sized to receive the hoof H of a horse completely below the coronary band C (also referred to as the hoof's hairline). That is, the upper 16 is limited in extent to a height that is designed not to overlap the hairline of the hoof intended for the boot of the inventions. This feature is important in order to avoid rubbing of the upper against the hairline, which is the part of the leg where the hoof transitions to a more sensitive region and is susceptible to irritation and possible damage. As shown better in FIG. 2, the upper 16 consists of a peripheral wall that runs along the edge of the sole 14 from the front to the sides and back of the shell 12 and is secured to the sole in a conventional manner. The upper 16, which is preferably molded and integral with the sole, defines an opening for receiving the hoof H. The height of the upper at the back of the shell 12 is relatively small and increases towards the front of the shell. The relatively small height of the upper at the back of the shell 12 facilitates the insertion of the hoof into the shell from the rear of the boot. In addition, as seen clearly in FIG. 2, the most rear portion of the upper is projected backward to form a lip 24 that further enlarges the opening for inserting the hoof into the boot shell and also provides a retaining structure for the gaiter 22, as will become clear from the description that follows. A relatively rigid lad (not shown), which may be serrated longitudinally, may be anchored to the front of each side of the upper inside the shell to extend around the back to provide rigidity to the lip 24 and correspondingly greater support in securing the hoof around the back of the boot.

The slit 18, located in the top front portion of the upper 16, has an open end at die top and extends a sufficient distance downward from the front top edge of the upper to allow the flexing of the upper's edges outwardly to enlarge the opening for inserting the hoof into the shell 12. A depth (or slit length) of about ½ the height of the front portion of the upper has been found to be optimal. The slit 18 needs also to be sufficiently wide to allow the inward contraction of the top edges of the upper that may be caused by deformation of the shell during use. A width of about ⅜ of an inch has been found to be sufficient.

Figure 3:
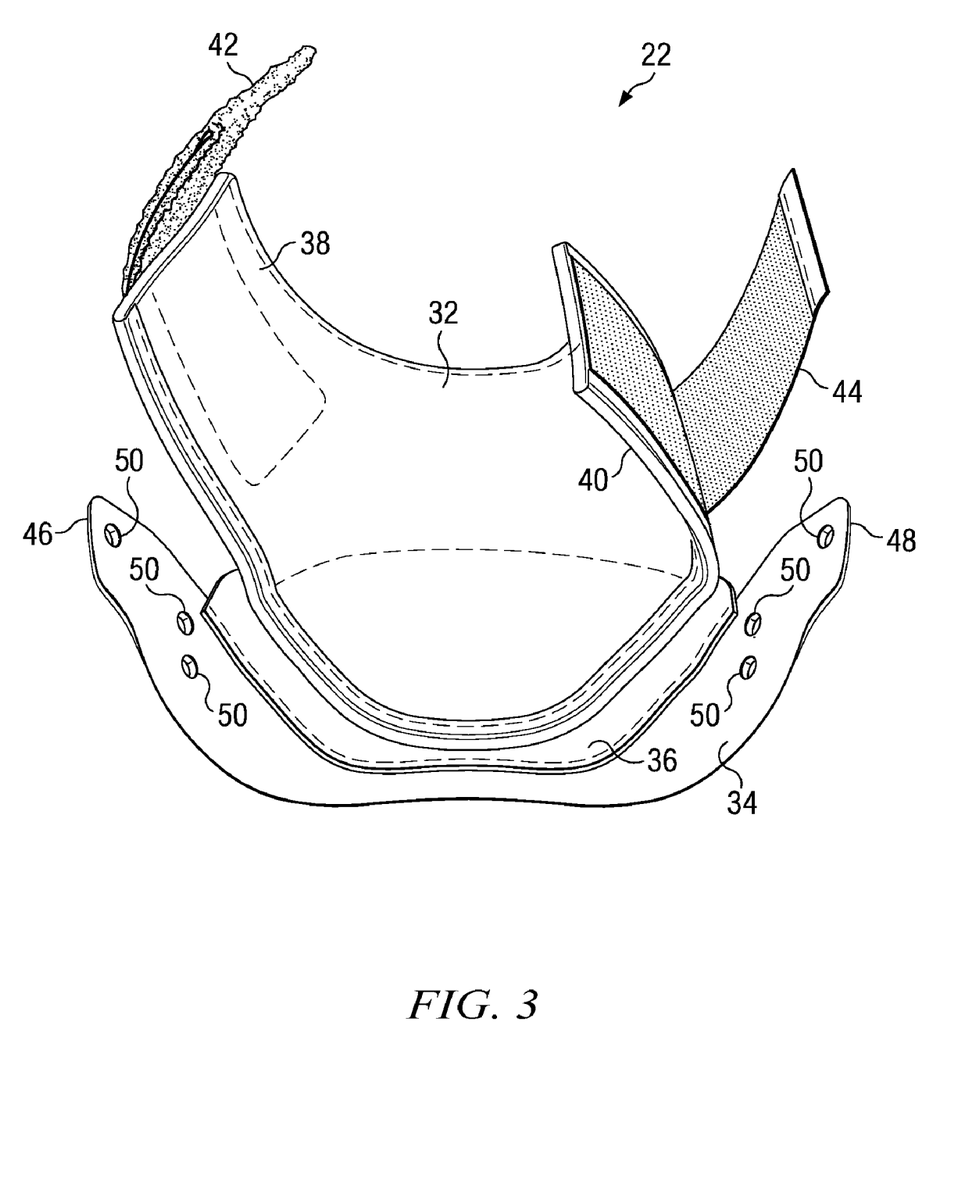
FIG. 3 is a front perspective view of the gaiter component of the boot of FIG. 1.
Figure 4:
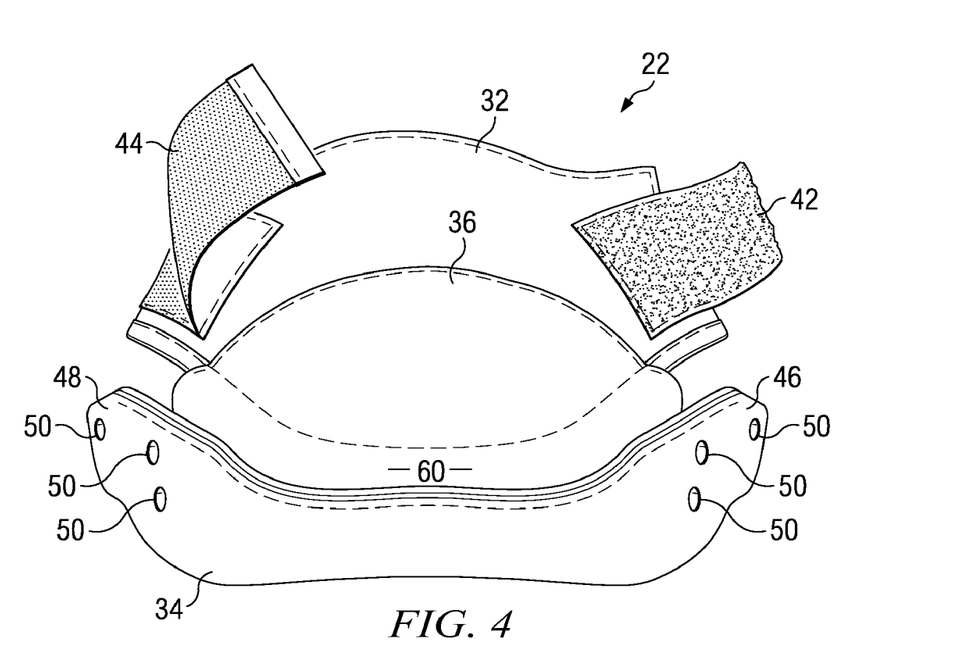
FIG. 4 is a rear perspective view of the gaiter of FIG. 3.
Figure 5:
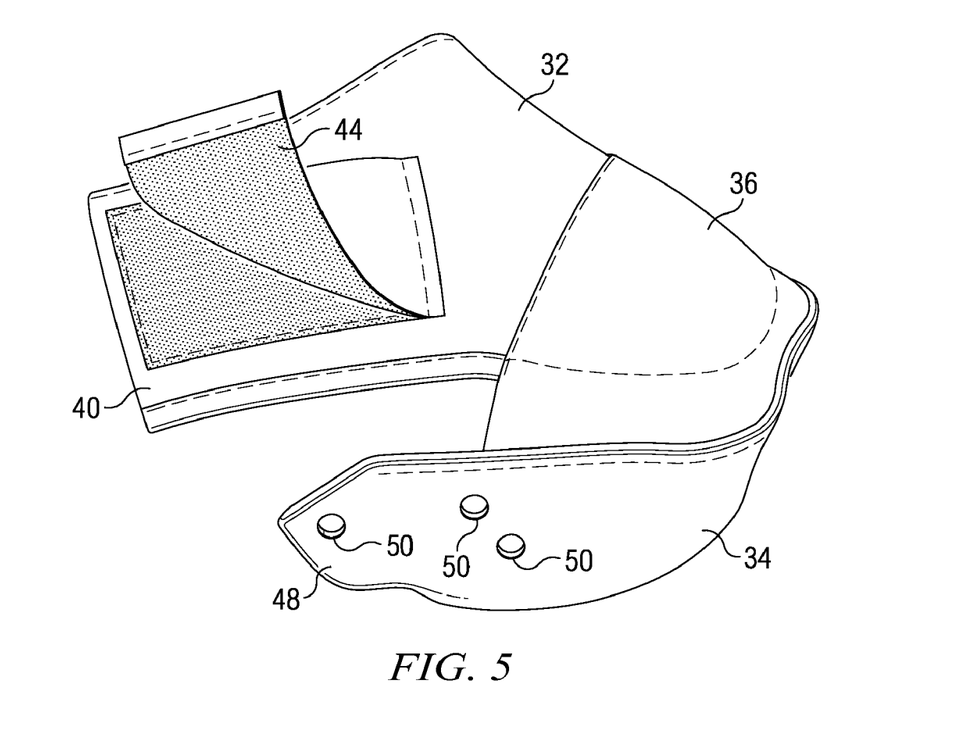
FIG. 5 is a left-side perspective view of the gaiter of FIG. 1.

Referring to FIGS. 3-5, the gaiter 22 of the horse boot 10 is illustrated as a detached, discrete structure. The gaiter 22 includes a wrapping section 32, a mounting section 34, and an intermediate connecting section 36 joining the wrapping and mounting sections to one another. The wrapping section 32 is made of flexible, stretchable material suitable for comfortable wear around the pastern of a horse. The preferred material is neoprene about ⅜ of an inch thick. The wrapping section 32 includes a central portion designed to cover the back of the hoof of the horse and two flaps 38,40 extending forward, so that they can be wrapped wound the pastern of the horse above the front hairline of the hoof and below die fetlock. In essence, the wrapping section 32 should enclose the pastern solely above a major portion of the front hairline and below the fetlock of the horse, so that a portion of the hairline is in a gap between the front lower edge of the gaiter and the top edge of the upper. These to features and the texture of the material we important in order to minimize contact of the gaiter with these particularly sensitive areas of the leg of the horse and avoid the irritation, chafing, and other problems cause by gaiters that totally envelop these areas. To the same end, the flaps 38,40 are preferably at least 1.5 inches wide in order to minimize the pressure exerted on the paste of the horses which obviously increases as the width of the flaps is decreased.

The flaps 38,40 are equipped with coupling means for releasably fitting the gaiter 22 around the pastern of the horse. In the preferred embodiment of the invention, such coupling means consists of a hook-and-loop fastener comprising two straps 42,44 adapted for layered engagement to provide an adjustable and secure enclosure. For example, as can be clearly understood from the front view of FIG. 3, the first strap 42 attached to flap 38 may be sandwiched between the outer surface of flap 40 and then overlaid with the second strap 44 attached to flap 40. Inasmuch as each contacting surface is provided with appropriately alternating hook-and-loop fastening material, the combination yields a very strong fastener to hold the gaiter 22 firmly wrapped around die pastern of the horse.

Figure 6:
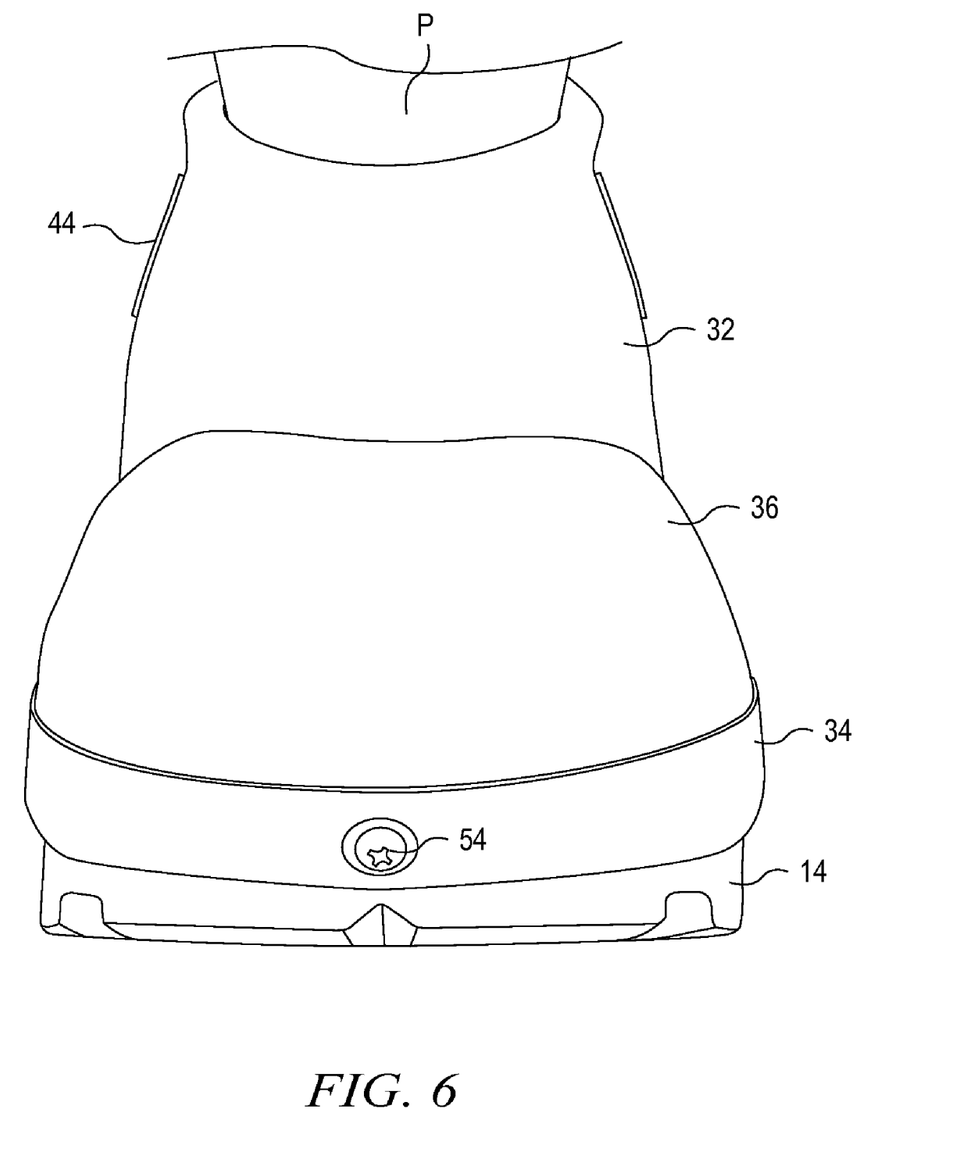
FIG. 6 is a rear perspective view of an alternative embodiment of the boot of the invention with a connecting section of the gaiter made entirely of two-way stretch material.

The mounting section 34 of the gaiter is designed to be attached to the rear sides of the upper 16 of the boot. As seen better in the rear and side views of FIGS. 4 and 5, the shape of the mounting section 34 conforms to die lip 24 and the rear sides of the upper 16, so that it can be mounted around them. To this end, the ends 46,48 of the mounting section are provided with sets of holes 50 that can be aligned with corresponding holes 52 in the sides of the upper of the boot for connection my means of screws 54 (see FIG. 1) that are mated with receiving nuts 20 (seen in FIG. 7) embedded in the upper 16. The mounting section 34 is preferably made of rigid material, such as plastic, suitable for coupling to the upper of die boot, as described, so as to provide a sturdy and reliable engagement between the gaiter and the shell of the boot. An additional screw (not shown in FIGS. 1-5) may be used to fasten the mounting section 34 also to the lip 24 at a point near the center of the lip (see FIGS. 6 and 7).

The connecting section 36 is used to provide a durable transition between the rigid mounting section 34 and the stretchable wrapping section 32. A portion of the stretchable wrapping section 32 may be extended downward to overlap and reinforce the top of the connecting section 36, preferably inside the connecting section, as seen in FIGS. 3 and 4. Alternatively, the connecting section 36 may consist of a single peace of material attached to the wrapping section 32 at the top and to the connecting section 34 at the bottom, as illustrated in the rear view of FIG. 6.

According to the improvement of the present invention, at least the bottom portion of the connecting section 36 is made of a two-way stretch material 60 (see FIG. 4), as defined above, placed so that it can be stretched horizontally but not vertically. That is, the two-way stretch material is attached to the mounting section 34 of the gaiter with the stretchable direction substantially parallel to the lip 24 of the upper 16. As a result the portion of the connecting section 36 directly above the mounting section 34 becomes sufficiently stretchable along the upper edge of die rigid mounting section 34 to allow the top of the gaiter 22 to be folded backward over the heel of the uppers as illustrated in FIG. 7, thereby removing the gaiter from the normal path for entry into the boot.

Two-way stretch material is well known and is commonly available in commerce, for example from John Howard Company of Chino, Calif., as Part No. W-311. Woven Elastic. If the wrapping section does not overlap the connecting section, a reinforcing piece of flexible but non-stretchable material, like leather or plastic, may be sewn on the inner upper portion of the connecting section. The material used should advantageously be stronger and more resistant to wear than the two-way stretch material 60 used for the connecting section 34, but care should be taken to leave uncovered a sufficiently large portion of two-way stretch material to retain the foldable function of the invention. As a result of this configuration, the two-way stretchability of the lower portion of the connecting section 34 is maintained so that the gaiter may be folded backward to facilitate installation of the boot. The rear portion and the flaps 38,40 of the wrapping section 32 remain unaffected by the material constituting the connecting section 34.

Figure 7:
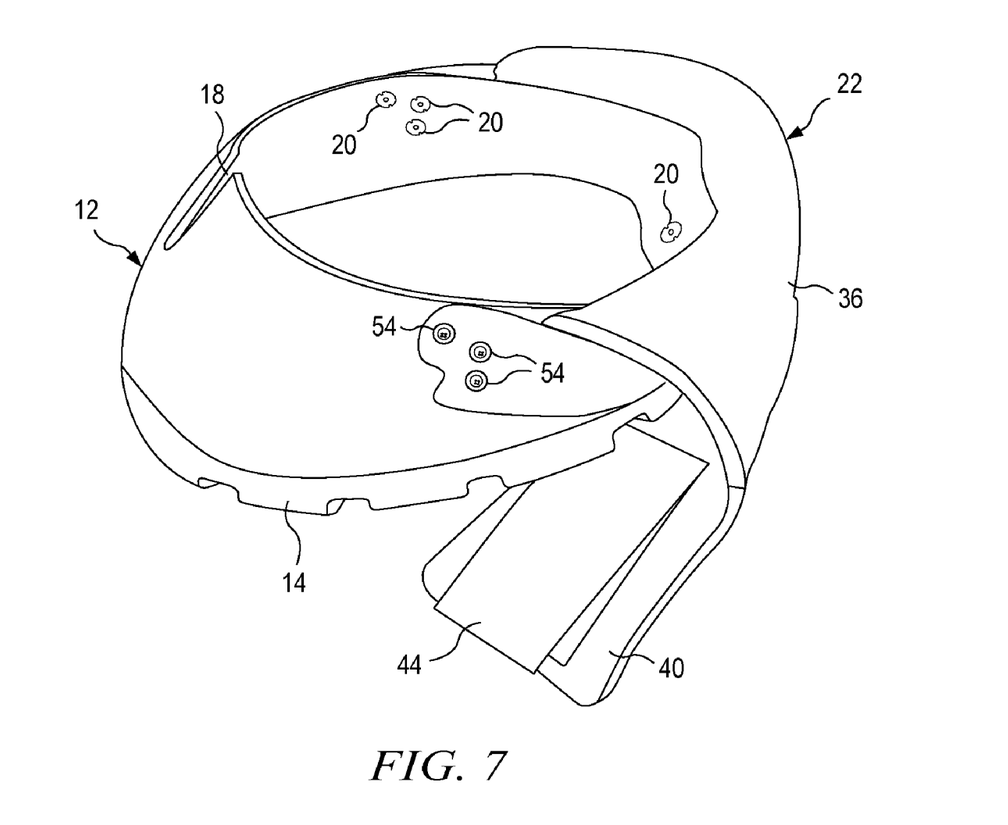
FIG. 7 is a side perspective view of the boot of FIG. 6 with the gaiter folded backward to facilitate entry of the hoof into the shell of the boot.

From FIG. 7 it can be seen that the boot 10 of the invention may be mounted on the hoof of a horse without obstruction from the gaiter 22. In the process, the top edges of the upper 16 are manually spread apart to further enlarge the shell, an operation that is advantageously facilitated by the presence of the front slit 18. Once the hoof is in place, the edges of the upper are released to resiliently fold back inward to press against and conform to the outer surface of the boor, thereby creating a snug connection sufficient to hold the boot firmly in place. The gaiter 22 is then folded back up and fastened around the pastern of the horse. As illustrated in FIG. 1, the gaiter 22 provides protection to the heel of the hoof of the horse, preventing infiltration of debris and other irritating material into the horse boot from behind and from most of the sides of the boot, the only portion remaining open being the front half of the hairline C. For best results of protection and ease of wear of the boot, it is recommended that the back side of the gaiter 22 cover at least the entire back of the hoof (that is, at least 180-degree coverage) and that the front side of the gaiter be open over at least two thirds of the front of the hoof (that is, the hairline should be uncovered over a span of at least 120 degrees).

Somewhat surprisingly, it was discovered that the boot of the invention stayed in place without any additional restraining mechanism even under harsh riding conditions. For example, the boot was used in an endurance competition covering over 150 miles under challenging terrain conditions without a single instance of boot separation. Therefore, the embodiment of the invention is preferred. However, it is understood that the gaiter of the invention could be used with other, more conventional, boot shells, such as the buckle boots and the elastic-fastener boots described in U.S. Pat. No. 7,461,497 and U.S. Ser. No. 12/082,480. An important advance in the art lies in the attachment of the gaiter 22 to the pastern of the horse, which provides an anchor that prevents the heel of the hoof from sliding out of the boot shell 12 under even the harshest riding conditions, even without a separate mechanism restraining the shell of the boot on the hoof. When the boot is subjected to a strong force tending to strip it from the hoot the stretchable material of the wrapping section provides sufficient give to temporarily accommodate some loosening of the heel and then retract the boot to its original position. Thus, the boot of the invention could never become totally loose and detached from the hoof, as has been the case with many prior-art boots. It is noted that this advantage would not be achieved if conventional stretchable material were used instead of the disclosed two-way stretchable material of the invention because the vertical stretchability of conventional material would allow the shell of the boot to become disconnected from the hoof under harsh riding conditions.

The gaiter 22 is much more susceptible to wear and tear than the shell 12 of the invention because of the softer and less resistant materials used to provide comfort and stretchability. Therefor, the gaiter is made replaceable during the life of the horse boot in order to take advantage of the longer useful life of the plastic shell. Accordingly, it is by far preferred that the gaiter be attached to the shell 12 by means of connections that can be easily uncoupled, such as screws, snaps, ball-and-socket, tongue-and-groove, channel-and-rod, hook-and-loop strips, or the like. As the quality of materials improves and materials with durability comparable to that or the shell 12 are developed that provide the described gaiter functions, it is anticipated that the boot of the invention may be manufactured with a permanently attached gaiter.

The shell 12 of the boot of the invention has been described as having a slit 18 to facilitate the manual spreading of the upper and to ensure that the upper can flex inward to conform to stresses and deformations produced during use. To ensure that the upper 16 presses against the side walls of the hoof, the shell 12 is formed so that the walls of the upper are normally bent inward by a degree greater than the normal slope of the sidewalls or the hoof. Specifically, the angles of the shell side walls and of the front wall relative to the sole are designed to be smaller than the angles of the hoof walls. Angles in the upper about 10 degrees greater than the corresponding angles of the hoof for which the boot is intended have been found to be optimal. Typically, hoof side walls are about 65 degrees and the front wall is about 55 degrees; accordingly, the preferred embodiment of the shell of the invention has side walls turned in at about 55 degrees and a front portion at an angle of about 45 degrees along the slit 18. The material and wall thickness of the shell are designed to enable the manual flexing of the upper when the hoof is being inserted into die shell and then to resiliently flex back inward when released to the point where the shell meets the hoof at the hoofs wall angles, which results in a very snug fit. The slit 18 also provides additional flex and elongation for hoofs that leave a large circumference near the hairline. A substantially uniform thickness of about 3/36 of an inch at the top and bottom of the upper has been found to be satisfactory in a molded polyurethane shell. The combination of the slit, shell thickness, wall angles and gaiter allow die boot to be worm hardware free. No buckles or fastening system are required.

Figure 8:
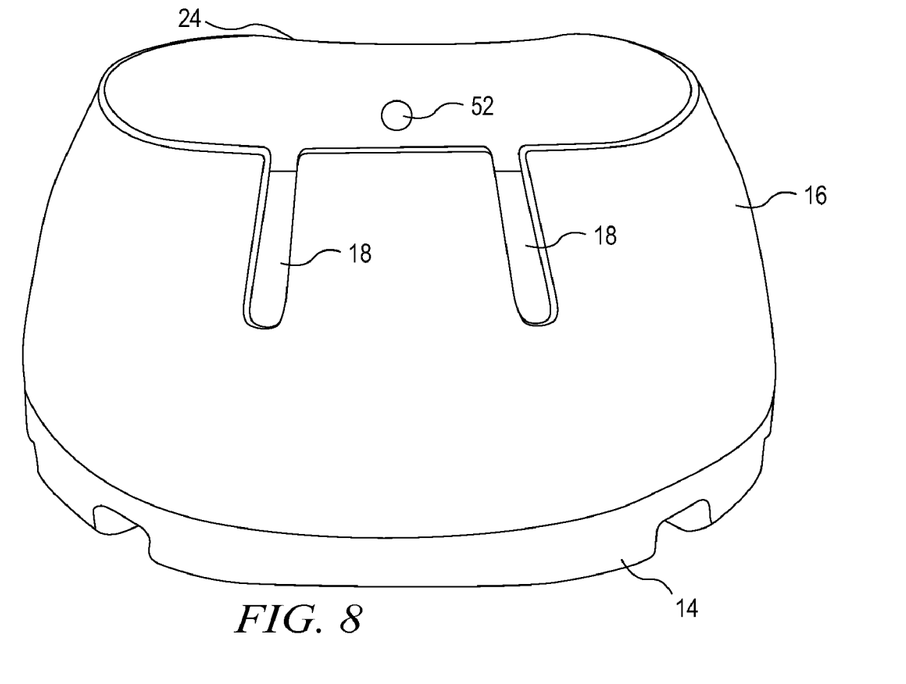
FIG. 8 is a front perspective view of an alternative embodiment of a shell featuring two slits in the upper of the boot.
Figure 9:
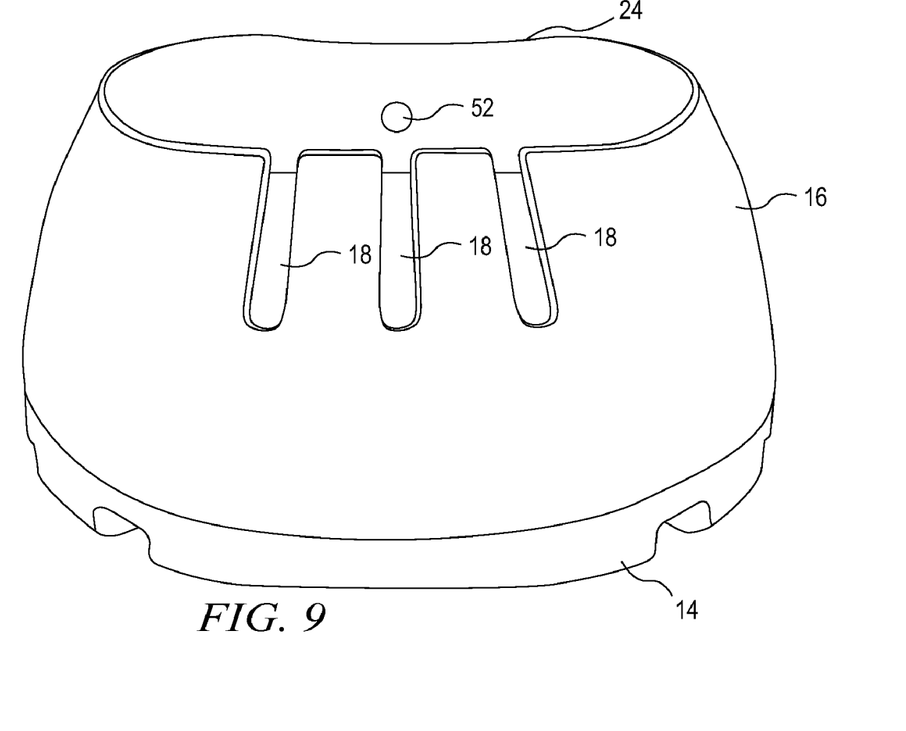
FIG. 9 is a front perspective view of an alternative embodiment of a shell, featuring three slits in the upper of the boot.

If a more rigid material than polyurethane is used for the shell of the invention, two or more slits 18 may be used, as illustrated in FIGS. 8 and 9. Preliminary tests indicate that the these configurations are acceptable for normal riding conditions so long as this type of shell is attached to the gaiter of the invention.

Figure 10:
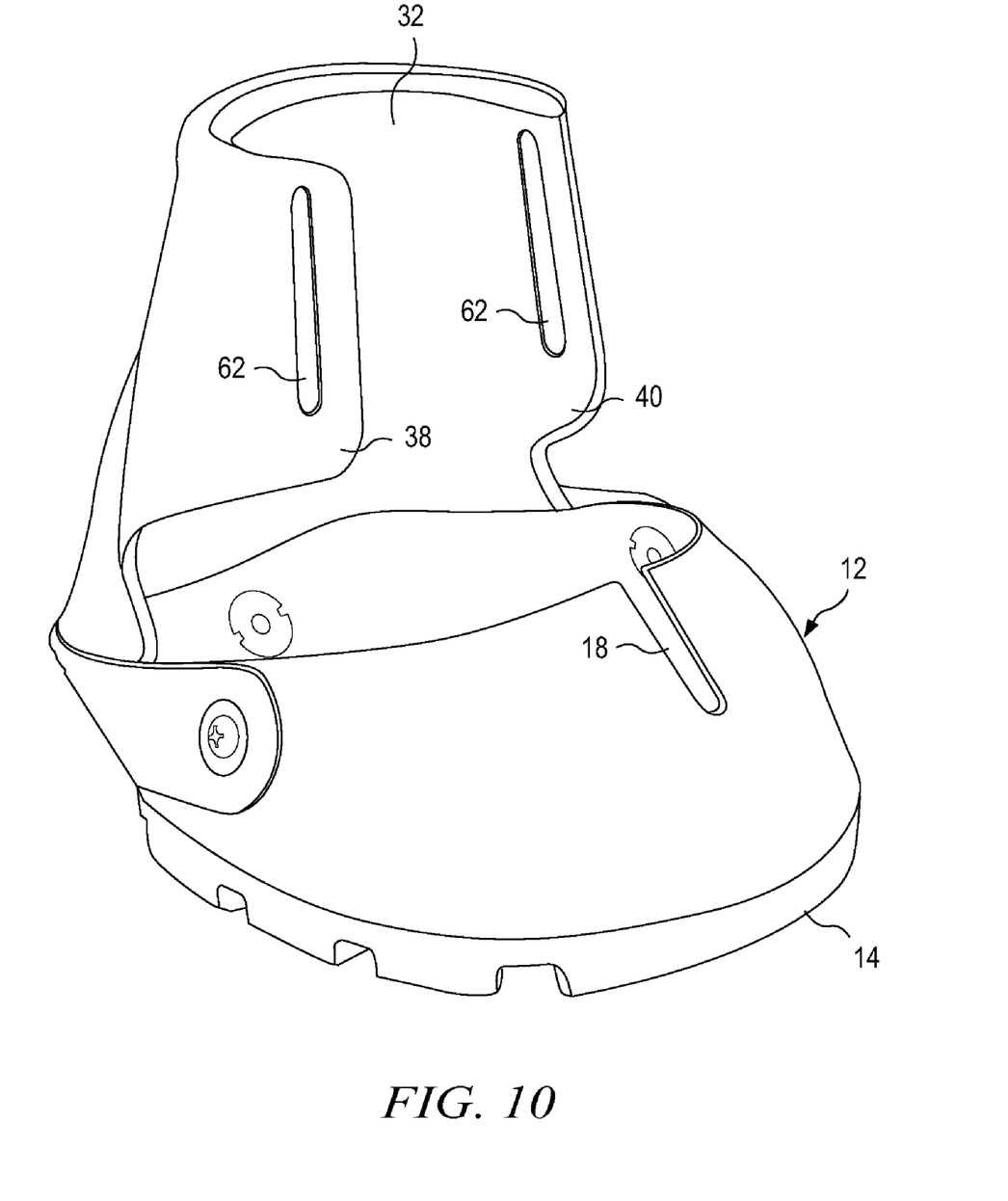
FIG. 10 is a perspective view of an alternative gaiter configuration that utilizes a separate strap for fastening around the pastern of the horse.
Figure 11:
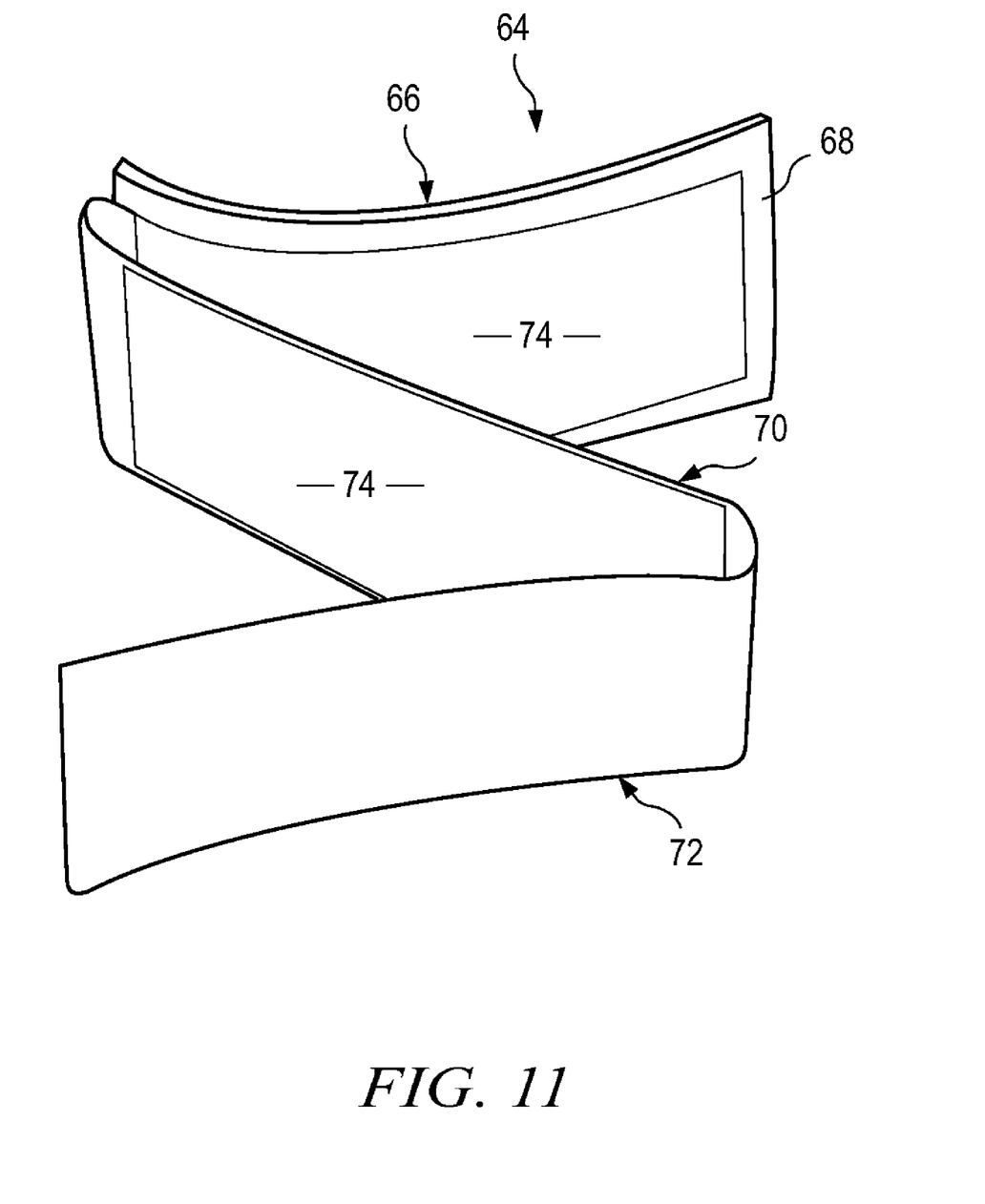
FIG. 11 is a perspective view of a strap suitable for use with the alternative gaiter configuration of FIG. 10.

In another embodiment of the invention illustrated in FIG. 10, the flaps 38,40 of the gaiter's wrapping section 32 are shorter than the flaps illustrated in FIGS. 1-5 and are equipped with oblong vertical eyelets 62, rather than the straps illustrated in those figures. A separate, detachable strap 64, illustrated in FIG. 1, is used to fasten the gaiter through those eyelets around the pastern of the horse. The strap 64 includes an inner section 66 that may have a padded portion 68, a mid-section 70, and an outer section 72. Each section is roughly one third the length of the entire strap 64.

Figure 12:
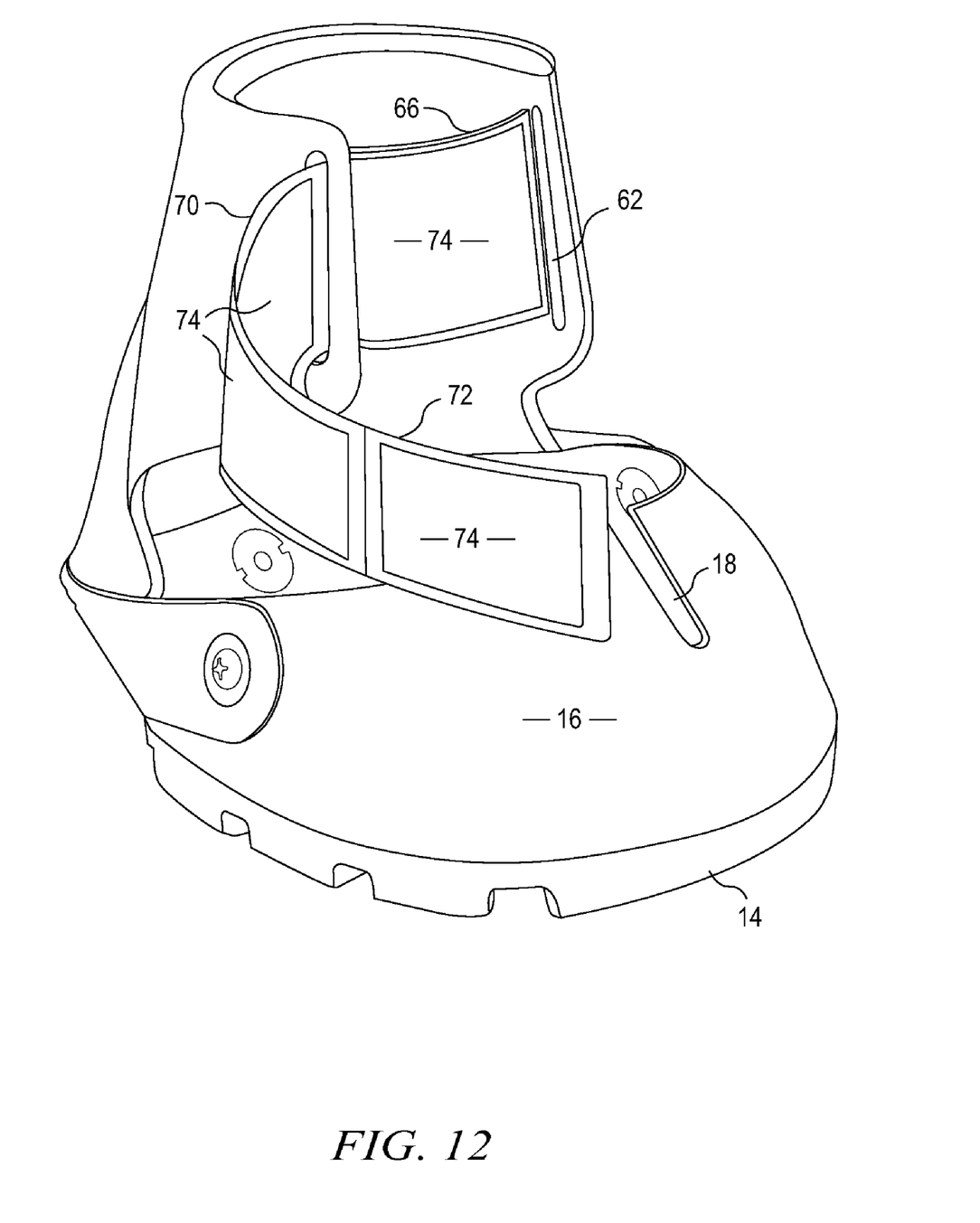
FIG. 12 shows the strap of FIG. 11 with one end threaded through one side or the gaiter of FIG. 10 to cover the front portion of the pastern of the horse.
Figure 13:
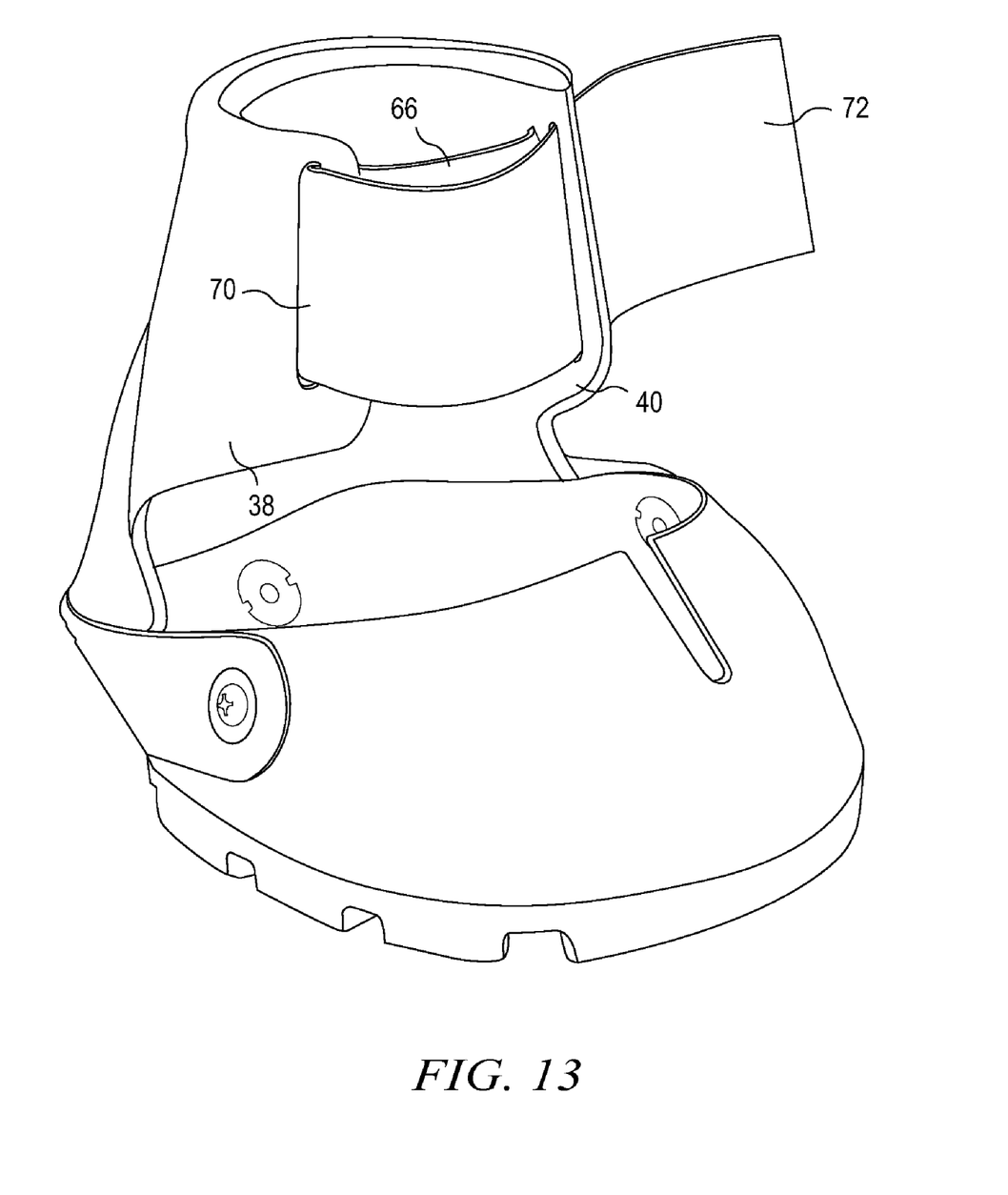
Figure 14:
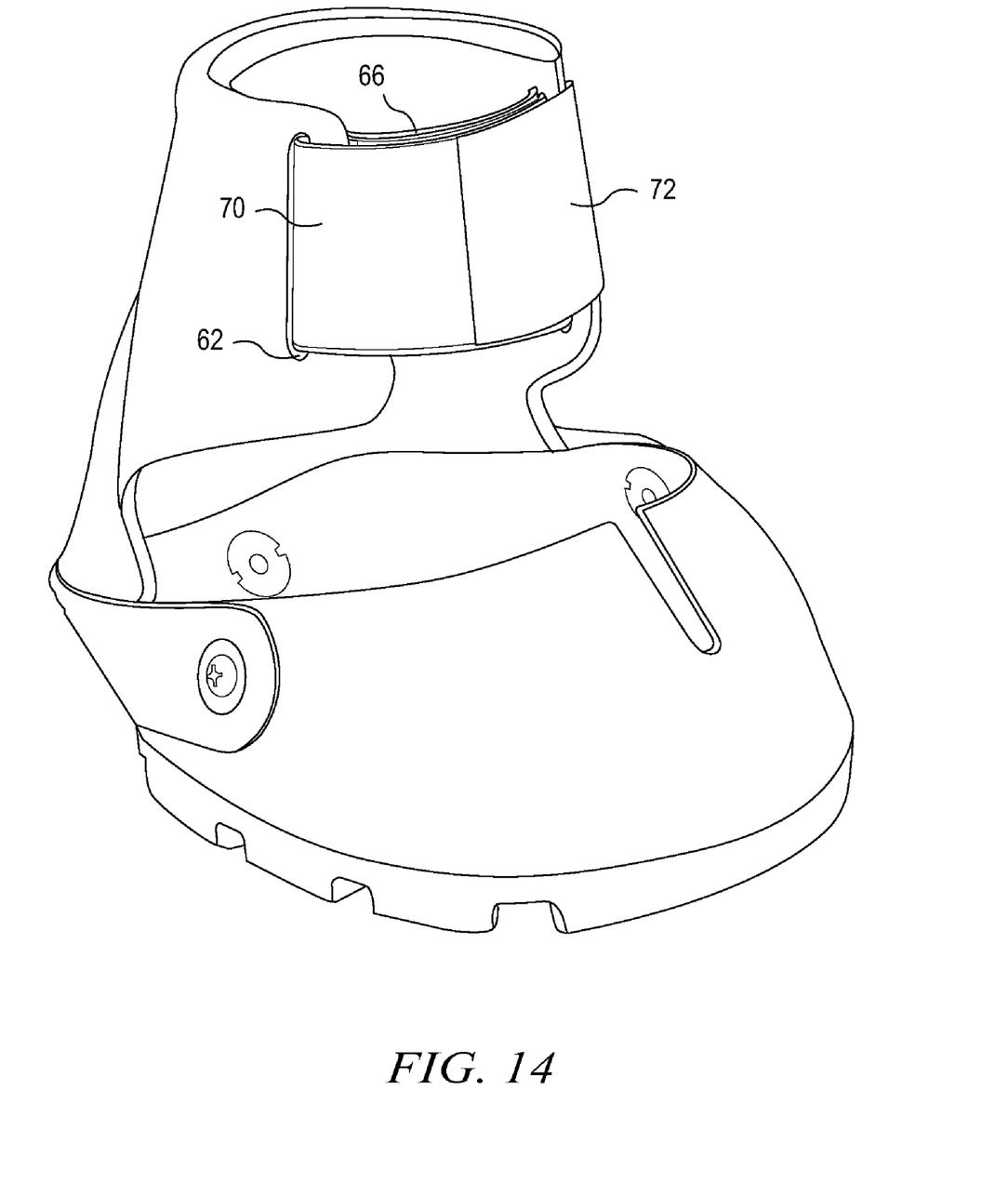
FIG. 14 shows the strap of FIG. 11 with the other end completely pulled through, folded overt and attached to its mid-section by means of a loop-and-hook fastener.

As illustrated in FIGS. 12-14, the outer section 72 of the strap 64 is first passed through the interior side of one eyelet 62 and pulled through until the inner section 66 (with its padding 68) is positioned to cover the portion of the pastern between the two flaps 38,40, as shown in FIG. 12. Then the outer section 72 is then passed through the interior side of the other eyelet 62 and pulled through to cause the midsection 70 to overlap the inner section 66. Finally, the outer section 72 is pulled to tighten the gaiter around the pastern of the horse and is folded to overlap the midsection 60, to which it is then fastened to secure the gaiter in place. Hook-and-loop pads 74 (shown only in FIGS. 11 and 12) attached to mating sides of each section of the strap 64 are preferably used as fastening devices.

In both embodiments of the gaiter of the invention, the height of the portion situated at the rear of the hoof and wrapped about 180 degrees around the pastern is about six inches. The remaining portion of the gaiters which corresponds essentially to the flaps or the strap enclosing the front of the pastern, is advantageously about three inches tall. These dimensions have been found to avoid overlap of the hairline as well as the fetlock of all average-size horses.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A boot for a hoof of a horse comprising:
a shell that includes a sole and an upper, said sole completely enclosing the hoof's underside; and
a gaiter that includes a mounting section releasably coupled to a portion of the upper, a wrapping section adapted to releasably wrap around and enclose a pastern of the horse, and a connecting section coupling the mounting section to the wrapping section;
wherein said upper comprises a slit with opposite sides that extend downward from a front top edge of the upper, thereby defining a substantially vertical gap, said opposite sides of the slit being free of any restraining structure overlapping said vertical gap;
wherein the upper includes side walls that are normally bent inward;
wherein said wrapping section encloses the pastern solely above a front hairline and below a fetlock of the horse, whereby a portion of said hairline is in a substantially horizontal gap between a front lower edge of the gaiter and said front top edge of the upper; and
wherein said mounting section coupled to a portion of the upper does not extend over said front top edge of the upper.

2. The boot of claim 1, wherein said slit extends though at least ½ a height of the upper.

3. The boot of claim 1, wherein said mounting section is releasably connected to a portion of the upper using screws.

4. The boot of claim 1, wherein said wrapping section includes stretchable material.

5. The boot of claim 4, wherein said stretchable material is neoprene.

6. The boot of claim 1, wherein said wrapping section includes at least one flap with hook-and-loop connectors for securing the gaiter around the pastern of the horse.

7. The boot of claim 1, wherein said wrapping section is approximately six inches high around a heel of a hoof of the horse and approximately three inches high around a front portion of the hoof.

8. The boot of claim 1, wherein said wrapping section includes eyelets and a strap for securing the gaiter around the pastern of the horse.

9. The boot of claim 1, wherein said connecting section encloses the portion of the upper over at least 180 degrees around a back portion of the hoof, and said hairline remains uncovered by said wrapping section over at least 120 degrees around a front portion of the hoof.

10. The boot of claim 1, wherein said upper comprises at least two slits, each of said slits having a top open end and opposite sides that extend downward from said front top edge of the upper, thereby defining a substantially vertical gap, said opposite sides of the slit being free of any restraining structure overlapping said vertical gap.

11. A boot for a hoof of a horse comprising:
a shell that includes a sole and an upper, said sole completely enclosing the hoof's underside; and
a gaiter that includes a mounting section releasably coupled to a portion of the upper, a wrapping section adapted to releasably wrap around and enclose a pastern of the horse, and a connecting section coupling the mounting section to the wrapping section;
wherein said upper comprises a slit with an open end and opposite sides that extend downward from said front top edge of the upper, thereby defining a gap though approximately ½ a height of the upper, said opposite sides of the slit being free of any restraining structure overlapping said gap;
said upper includes side walls that are normally bent inward;
said mounting section releasably coupled to a portion of the upper does not extend over a front top edge of the upper and is connected to the upper using screws;
said connecting section includes two-way stretch material that provides substantially horizontal stretchability along said portion of the upper; and
said wrapping section includes stretchable neoprene material, encloses the pastern solely above a front hairline and below a fetlock of the horse, whereby a portion of said hairline is in a gap between a front lower edge of the gaiter and said front top edge of the upper, and includes at least one flap with hook-and-loop connectors for securing the gaiter around the pastern of the horse.

12. The boot of claim 1, wherein said connecting section includes two-way stretch material that provides substantially horizontal stretchability along said portion of the upper.

13. The boot of claim 1, wherein said upper includes side walls that are normally bent inward by an amount greater than a slope of a hoof sidewalls of the horse wearing the boot.

* * * * *